United States Patent [19]
Beckers

[11] 3,862,250

[45] Jan. 21, 1975

[54] METHYLENE CHLORIDE STABILIZED WITH ACETONITRILE

[75] Inventor: Norman L. Beckers, Chardon, Ohio

[73] Assignee: Diamond Shamrock Corporation, Cleveland, Ohio

[22] Filed: Feb. 23, 1973

[21] Appl. No.: 335,366

[52] U.S. Cl. ......... 260/652.5 R, 252/171, 252/392, 252/394

[51] Int. Cl. ..................... C07c 17/40, C07c 17/42

[58] Field of Search ............................. 260/652.5 R

[56] References Cited
UNITED STATES PATENTS

| | | | |
|---|---|---|---|
| 3,285,857 | 11/1966 | Rathbone et al. | 260/562.5 R X |
| 3,326,988 | 6/1967 | Stack | 260/652.5 R |
| 3,326,989 | 6/1967 | Cormany et al. | 260/652.5 R |
| 3,423,476 | 5/1969 | Patron | 260/652.5 R |
| 3,445,532 | 5/1967 | Richtzenhain et al. | 260/652.5 R |
| 3,535,392 | 10/1970 | Cormany et al. | 260/652.5 R |
| 3,670,036 | 6/1972 | Vivian | 260/652.5 R |

*Primary Examiner*—Howard T. Mars
*Attorney, Agent, or Firm*—William A. Skinner

[57] ABSTRACT

Acetonitrile and optionally propylene oxide in admixture with methylene chloride have been found to prevent degradation of methylene chloride in the presence of metals, metal halides, combinations thereof, and aromatic compounds, which react with methylene chloride in the presence of said metals, metal halides and combinations thereof. Reactions of aliphatic organic compounds with said metals, metal halides and combinations thereof to form products which result in deterioration of methylene chloride are also inhibited. A method for vapor degreasing metals by using the stabilized methylene chloride is described.

2 Claims, No Drawings

METHYLENE CHLORIDE STABILIZED WITH ACETONITRILE

BACKGROUND OF THE INVENTION

Methylene chloride is a highly versatile and useful solvent for various industrial applications at both normal and elevated temperatures. A particularly important industrial use is the vapor degreasing of metals. Methylene chloride is known to be more stable than other chlorinated hydrocarbons solvents such as perchloroethylene, trichloroethylene and methyl chloroform when the solvents are used in unstabilized condition. For example, methylene chloride is more resistant to oxidation, hydrolysis and pyrolysis than other chlorinated solvents and does not substantially react with aluminum in the aluminum scratch test commonly used to indicate unstabilized or minimally stabilized methyl chloroform. In addition methylene chloride may be used to greater advantage in vapor degreasing of metals than other known degreasing solvents since it may be used effectively at lower temperatures due to its lower boiling point and excellent stability. Methylene chloride is particularly desirable for such degreasing operations since it is substantially resistant to photochemical activity and therefore does not contribute to air pollution by smog formation. However, methylene chloride when used in various metal cleaning functions, including vapor degreasing, suffers the disadvantage of being reactive with aromatic compounds in the metals such of metals, metal halides and combinations thereof, including aluminum, zinc and iron, halides thereof, and combinations of said metals and halides which react with the methylene chloride to produce hydrochloric acid and objectionable high boiling tarry substances which render the methylene chloride unsuitable for further use. The entire reaction of methylene chloride in the presence of aromatic compounds is not completely understood but is believed to be a condensation reaction catalyzed by metal, metal halides or combinations thereof. Thus, the aromatic compound reaction with methylene chloride is believed to be catalyzed, or initiated and catalyzed by the presence of metal such as aluminum, zinc, iron and the like, halides of said metals and combinations of said metals and halides. Such reactions are thought to be of the nature of a Friedel-Craft type reaction. Methylene chloride also disadvantageously suffers degradation by reaction of aliphatic organic compounds such as trans-dichloroethylene, 1,1,1-trichloroethane and carbon tetrachloride with said metals, metal halides and combinations thereof. The reaction products are colored tar-like masses which render the methylene chloride unsuitable for use as a solvent, particularly in vapor degreasing of metals. Aromatic and aliphatic organic compounds of this nature and metals such as aluminum, iron and zinc, their halides and combinations are generally introduced into the methylene chloride from various cutting oils and lubricants used in metal fabricating operations which are carried over into the methylene chloride solvent during vapor degreasing or other cleaning of the fabricated metal parts. Solvent manufacturing, handling and storage equipment is another source for introduction of such impurities. To prevent degradation and other types of deterioration such as oxidation, hydrolysis and pyrolysis which may occur in some instances, it has been the practice to incorporate minor quantities of various organic compounds into methylene chloride, which compounds act as stabilizers to substantially prevent such degradation. It is desirable to provide methylene chloride stabilized to effectively prevent degradation in various applications, and the demand still exists for a low cost stabilized methylene chloride composition that can be easily prepared and which provides optimum stabilization under many different operating conditions.

SUMMARY OF THE INVENTION

An object of this invention is to prevent deterioration or degradation of methylene chloride in association with metals, metal halides and combinations including aluminum, iron and zinc, halides of said metals, combinations thereof, and an aromatic compound capable of reacting with methylene chloride in the presence of said metals, metal halides and combinations.

Another object of this invention is to prevent deterioration or degradation of methylene chloride in association with metals, metal halides and combinations thereof including aluminum, iron and zinc, halides of said metals, combinations thereof and an aliphatic organic compound capable of reacting with these metals, metal halides and combinations thereof in the presence of methylene chloride.

A further object of this invention is to provide a stabilized methylene chloride composition in which the stabilizers are low in cost and capable of being incorporated with ease into the methylene chloride.

A still further object of this invention is to provide a process for the degreasing of metals by contacting the metals with methylene chloride stabilized to prevent degradation of the methylene chloride in the presence of metals, metal halides and combinations thereof incuding aluminum, iron and zinc, halides of said metals, combinations thereof and aromatic compounds which react with the methylene chloride in the presence of said metals, metal halides and combinations.

Still another object of this invention is to provide a process for the degreasing of metals by contacting the metals with methylene chloride stabilized to prevent degradation of the methylene chloride in the presence of an aliphatic organic compound which reacts with metals including aluminum, iron, zinc and the like, halides of said metals and combinations of the individual metals and salts thereof.

These and additional objects of the present invention will become apparent to those skilled in the art from the description and claims which follow.

DESCRIPTION OF THE PREFERRED EMBODIMENTS

The objects set forth above have been found to be attained by providing a composition consisting essentially of methylene chloride containing stabilizing amounts of from about 0.05 to about 2.0 percent by weight of the methylene chloride of acetonitrile and optionally of propylene oxide.

The quantity of the stabilizing agents useful in the practice of this invention will vary depending upon the conditions of use, the identity and quantity of other stabilizers incorporated into the methylene chloride and other practical operating considerations. Each stabilizing agent or compound may generally be used within the range of from about 0.05 to about 2.0 percent and preferably from about 0.10 to about 1.0 percent by weight of the methylene chloride. Although higher concentrations may be used, if desired, no additional benefit is obtained and the cost is unnecessarily increased. While the above composition containing stabilizing agents provides optimum prevention of degradation of the methylene chloride under a variety of operating conditions it is also possible to stabilize methylene chloride by deleting the propylene oxide depending on the stabilization required for the particular operating condition.

The stabilized composition may be used for the degreasing of metals by contacting the metals with the stabilized composition. It is also possible to use the stabilized methylene chloride composition for degreasing metals by deleting the propylene oxide. Thus, the process for vapor degreasing metals comprises contacting the metals to be degreased with the above described stablized methylene chloride compositions wherein the methylene chloride contains either acetonitrile only or an admixture of stabilizing amounts of acetonitrile and propylene oxide.

In degreasing metals with the above described preferred stabilized methylene chloride in the presence of an reacts with compound which reactswith methylene chloride in the presence of metals, metal halides and combinations thereof including aluminum, iron, zinc, halides of said metals and combinations, there exists upon contact of the metal with the stabilized methylene chloride a composition comprising methylene chloride, a stabilizing amount of from about 0.05 to about 2.0 weight percent of the methylene chloride or acetonitrile, optionally from 0.05 to about 2.0 percent by weight of propylene oxide, and an organic compound which reacts with methylene chloride in the presence of said metals, metal halides and combinations. The metals, metal halides and combinations may be present from any source such as chloride formed by drilling or other machining of aluminum or aluminum-containing materials with various working fluids such as cutting oils, lubricants and the like, or aluminum chloride may be present from the reaction of methylene chloride with aluminum. The reactive aromatic compounds include toluene, mesitylene, naphthalene, durene, and the like. The reaction of methylene chloride in the presence of aliphatic organic compounds such as trans-dichloroethylene, carbon tetrachloride and 1,1,1-trichloroethane and metals, metal halides and combinations may also be inhibited by methylene chloride stabilized with the same amounts of acetonitrile and optionally propylene oxide as above described.

In order that those skilled in the art may readily understand the present invention and certain specific embodiments by which it may be carried into effect the following illustrative examples are presented.

In Examples 1 and 2, respectively, of Table I, 15 ml of substantially water-free methylene chloride and methylene chloride stabilized with 1.6% weight of acetonitrile respectively, were placed in glass vials containing a 1 $cm^2$ aluminum coupon 1/64 inch thick. The vials were tightly capped and allowed to stand at ambient conditions. After 16 hours no changes had taken place in the appearance of the solvent, the pH or the aluminum in each vial. Toluene in an amount of 5% by volume and about 0.04 grams of anhydrous aluminum chloride were then added to each vial, the contents stirred, changes in the contents recorded, and the vials loosely capped and allowed to stand. After four hours and after twenty-two hours changes in the appearance of the aluminum coupons and the solvents, and relative pH values of the solvents were recorded. The procedure of Examples 1 and 2 was followed in Examples 3 to 7 of Table I. In the latter Examples various compounds reported in the prior literature to be useful in stabilizing chlorinated solvents were evaluated for their ability to stabilize methylene chloride. In Examples 3 to 7 after the tightly capped vials had been standing for 16 hours no changes had occurred in the appearance of the solvent, the pH or the aluminum coupons. The results of the tests of Examples 1 to 7 are set forth in Table I.

From Table I it will be readily observed that after four hours the methylene chloride without acetonitrile had undergone a degradation reaction resulting in a dark orange coloration, evolvement of hydrogen chloride gas and complete loss of utility of the solvent. Examples 3 to 7 inclusive of Table I show that various compounds frequently used as solvent stabilizers are not as effective as acetonitrile in inhibiting degradation of methylene chloride by reaction of aromatic compounds with methylene chloride in the presence of metals, metal salts and combinations thereof.

TABLE I

INHIBITION OF REACTION OF AROMATIC COMPOUNDS WITH METHYLENE CHLORIDE

| Example No. | Solvent System | Upon Addition of 5% Vol. Toluene and 0.04 grams Aluminum Chloride | After 4 Hours | After 22 Hours |
|---|---|---|---|---|
| 1 | Methylene Chloride Containing Aluminum Coupon | Light Yellow Precipitate | Dark Orange pH<3 HCl fumes | No change |
| 2 | Methylene Chloride Containing Aluminum Coupon Stabilized With 1.6 Wt. % Acetonitrile | White Precipitate | White Precipitate Solution Colorless pH about 6.0 | No change |
| 3 | Methylene Chloride Containing Aluminum Coupon Stabilized With 2.8 Wt.% Dimethoxymethane | Solution light brown Purple Precipitate Turned purple-brown after a few minutes | Solution light gray-tan Brown spots on Aluminum Coupons Grey-white precipitate pH<3 | No Change |

TABLE I – Continued

INHIBITION OF REACTION OF AROMATIC COMPOUNDS WITH METHYLENE CHLORIDE

| Example No. | Solvent System | Upon Addition of 5% Vol. Toluene and 0.04 grams Aluminum Chloride | After 4 Hours | After 22 Hours |
|---|---|---|---|---|
| 4 | Methylene Chloride Containing Aluminum Coupon Stabilized With 0.7 Wt.% Methyl Butynol | Solution Dark Purple Colored | Solution Purple-black and Precipitate Present pH about 3.5 | Black Precipitate Solution Yellow-Green pH about 4.5 |
| 5 | Methylene Chloride Containing Aluminum Coupon Stabilized With 2.8 Wt. % 1,1-Dimethoxyethane | Light Lavender Precipitate | Solution Dark Gray And Precipitate Present pH about 3 | pH about 4.5 |
| 6 | Methylene Chloride Containing Aluminum Coupon Stabilized With 2.0 Wt. % 1,3-Dioxolane | Yellow Green Precipitate | Yellow Precipitate On Aluminum Coupon Solution Green-Gray pH about 3.5 | White Precipitate Solution Yellow pH about 4.5 |
| 7 | Methylene Chloride Containing Aluminum Coupon Stabilized With 0.8 Wt. % 1,4-Dioxane | Red Precipitate | Orange Precipitate On Aluminum Coupon Solution Colorless pH about 4.0 | Pink-Brown Precipitate Solution Colorless pH about 4.5 |

In Examples 8 to 14 of Table II, below, an aluminum reflux stability test was carried out by placing 120 ml of substantially water free methylene chloride and about 0.5 grams of 20 mesh aluminum in a flat bottom 300 ml boiling flask fitted with a condenser. An aluminum coupon about 1½ × 9 cm was inserted in the condenser. During the extended period of reflux the solvent vapor surrounded, condensed, and dripped from the suspended strip. The methylene chloride was refluxed for a varying number of days. In all the Examples the pH and acid content, as HCl, were determined on the aqueous phase following extraction of the solvent with an equal volume of neutral distilled water and after the system was refluxed for varying time periods.

In Examples 8 to 14, inclusive, 5% by volume of commercially available stabilized vapor degreasing grade of 1,1,1-trichloroethane was added to the methylene chloride.

The results of the various tests are shown in Table II below.

In Example 8 of Table II deterioration of the solvent system occurred due to the reaction of aluminum with the contained 1,1,1-trichloroethane. In Examples 9 to 14 of Table II the addition of acetonitrile and the combination of acetonitrile and propylene oxide to this solvent system prevented such deterioration even after the addition of anhydrous aluminum chloride and refluxing of the system an additional 6 days.

TABLE II

EFFECT OF ALIPHATIC ORGANIC COMPOUNDS ON ALUMINUM REFLUX STABILITY TESTS OF METHYLENE CHLORIDE

| Example No. | Solvent System | Volume Additive | Days Reflux | pH | Acid as ppm HCl | Condenser Coupon* Color of Corrosion | Solvent |
|---|---|---|---|---|---|---|---|
| 8 | Methylene Chloride | 5% 1,1,1-Trichloroethane | 1/3 | <3 | HCl Fumes | Severe | Black |
| 9 | Methylene Chloride plus 0.25% by wt. Acetonitrile | 5% 1,1,1-Trichloroethane | 8 | 7.0 | None | None | Clear and Colorless |
| 10 | Same as Example 9 with addition of about 0.04 g. anhydrous AlCl$_3$ and one additional day of reflux | 5% 1,1,1-Trichloroethane | 9 | 5.6 | | None | Clear and colorless |
| 11 | Same as Example 10 with addition of about 0.04 g. anhydrous AlCl$_3$ and five additional days of reflux | 5% 1,1,1-Trichloroethane | 14 | 4.9 | 21 | None | Colorless, Slightly Turbid |

TABLE II – Continued

EFFECT OF ALIPHATIC ORGANIC COMPOUNDS ON ALUMINUM
REFLUX STABILITY TESTS OF METHYLENE CHLORIDE

| Example No. | Solvent System | Volume Additive | Days Reflux | pH | Acid as ppm HCl | Condenser Coupon Color of Corrosion* | Solvent |
|---|---|---|---|---|---|---|---|
| 12 | Methylene Chloride plus 0.25% by wt. Acetonitrile and 0.25% by wt. Propylene Oxide | 5% 1,1,1-Tri-chloroethane | 8 | 7.0 | 0 | None | Clear and colorless |
| 13 | Same as Example 12 with addition of about 0.04 g. anhydrous AlCl₃ and one additional day of reflux | 5% 1,1,1-Tri-chloroethane | 9 | 7.0 | 0 | None | Colorless Slightly Turbid |
| 14 | Same as Example 13 with addition of about 0.04 g. anhydrous AlCl₃ and five additional days of reflux | 5% 1,1,1-Tri-chloroethane | 14 | 6.0 | 5 | None | Light Gray Slightly Turbid |

The inhibition of the degradation of methylene chloride by the reaction between 1,1,1-trichloroethane and aluminum and metal salts by acetonitrile and optionally propylene oxide is especially surprising and unexpected when it is realized that the stabilizers included in the commercial vapor degreasing grade 1,1,1-trichloroethane to prevent reaction of the 1,1,1-trichloroethane with metals and or metal salts in the presence of chlorinated solvents failed to inhibit the degradation of the methylene chloride. Only when the acetonitrile and optionally propylene oxide were admixed with the methylene chloride containing the stabilized 1,1,1-trichloroethane was degradation of the methylene chloride prevented.

In all the examples of Table III, below, the aluminum reflux stability tests consisted of placing 190 ml of methylene chloride in a 300 ml flask, adding about 1.0 gram of 20 mesh aluminum and suspending a bright aluminum coupon about 2 × 7 cm. in a condenser fitted to the flask. Methylene chloride and the solvent containing durene, mesitylene and toluene and combinations of durene, mesitylene and toluene with acetonitrile were refluxed for varying time periods. In all the tests the pH and acid content, as HCl, were determined and the aluminum condenser coupon was visually observed at the completion of each test. The results of these tests are set forth in Table III below.

The tests in both Tables II and III were conducted by venting the condenser to room air and without the addition of water. Also in Tables II and III the pH determinations were made with a portion of the water-layer obtained by extraction of the solvent with a volume of water equal to the volume of the solvent system.

TABLE III

EFFECT OF AROMATIC COMPOUNDS ON ALUMINUM REFLUX STABILITY TESTS WITH METHYLENE CHLORIDE

| Example No. | Solvent System | Volume Additive | Days Test | pH | Acid as ppm HCl | Color Solvent | Condenser Coupon Corrosion |
|---|---|---|---|---|---|---|---|
| 15 | Methylene Chloride | 0 | 3 | 7.0 | None | Clear and Colorless | Blisters |
| 16 | Methylene Chloride | 5% Toluene | 1.5 | <3 | HCl Fumes | Solution Orange-Black | General Severe |
| 17 | Methylene Chloride + 0.25 wt.% of Acetonitrile | 5% Toluene | 20 | 7.0 | None | Clear and Colorless | None |
| 18 | Methylene Chloride + 0.25 wt. % Acetonitrile | 5% Mesitylene | 20 | 7.0 | None | Clear and Colorless | None |
| 19 | Methylene Chloride | 5% Durene (Tetramethyl Benzene) | 5 | — | — | Pink | Purple Blisters |
| 20 | Example 19 after one additonal day of reflux | 5% Durene | 6 | 5.4 | 108 | Yellow, turbid | General Severe |

Table III illustrates the prevention of degradation of methylene chloride by acetonitrile in the presence of aluminum and aluminum chloride and the aromatic compounds toluene and mesitylene in Examples 17 and 18. Examples 19 and 20 show degradation of methylene chloride in the presence of another aromatic compound, durene, (tetramethyl benzene) when refluxed with aluminum.

Although the present invention has been described with detailed reference to specific embodiments thereof, it is not intended to be so limited since modifications and alterations may be made therein which are within the complete intended scope of this invention as defined by the appended claims.

What is claimed is:

1. A stabilized methylene chloride composition consisting essentially of methylene chloride and stabilizing amounts of from about 0.05 to about 2.0 percent by weight of the methylene chloride of each of acetonitrile and propylene oxide.

2. The composition of claim 1 wherein from about 0.10 to about 1.0 percent by weight of each of acetonitrile and propylene oxide is present.

* * * * *

UNITED STATES PATENT OFFICE
CERTIFICATE OF CORRECTION

PATENT NO. : 3,862,250
DATED : January 21, 1975
INVENTOR(S) : Norman L. Beckers

It is certified that error appears in the above-identified patent and that said Letters Patent are hereby corrected as shown below:

Column 1, line 30, delete "metals such" and insert --presence--; line 43, "metal" should read --metals--.

Column 3, line 24, delete "reacts with compound which reactswith" and insert --aromatic compound which reacts with--.

Column 6, Table II, in the heading of the next to last column delete "Color of"; in the heading of the last column insert --Color of--.

Column 7, Table II, in the heading of the next to last column delete "Color of"; in the heading of the last column insert --Color of--; at the bottom of the Table add --*Determined by visual observation--; line 52, after "and" insert --/--.

Signed and sealed this 13th day of May 1975.

(SEAL)
Attest:

RUTH C. MASON
Attesting Officer

C. MARSHALL DANN
Commissioner of Patents
and Trademarks